US009554607B2

(12) United States Patent
Mack et al.

(10) Patent No.: US 9,554,607 B2
(45) Date of Patent: Jan. 31, 2017

(54) COMMUNICATION SYSTEM FOR IMPACT SENSORS

(75) Inventors: Christoph Mack, Seattle, WA (US); Christopher B. Doughty, Seattle, WA (US); Robert Snook, Kenmore, WA (US); Nick Vallidis, Seattle, WA (US)

(73) Assignee: X2Impact, Inc., Seattle, WA (US)

( * ) Notice: Subject to any disclaimer, the term of this patent is extended or adjusted under 35 U.S.C. 154(b) by 671 days.

(21) Appl. No.: 13/009,631

(22) Filed: Jan. 19, 2011

(65) Prior Publication Data
US 2011/0181418 A1   Jul. 28, 2011

Related U.S. Application Data

(60) Provisional application No. 61/336,429, filed on Jan. 22, 2010, provisional application No. 61/409,906, filed on Nov. 3, 2010.

(51) Int. Cl.
G08B 23/00 (2006.01)
A42B 3/04 (2006.01)
G01L 1/26 (2006.01)
A63B 71/08 (2006.01)
A63B 71/10 (2006.01)

(52) U.S. Cl.
CPC .............. *A42B 3/046* (2013.01); *G01L 1/26* (2013.01); *A63B 71/085* (2013.01); *A63B 71/10* (2013.01); *A63B 2220/40* (2013.01); *A63B 2220/53* (2013.01); *A63B 2225/50* (2013.01)

(58) Field of Classification Search
CPC ... A42B 3/046; A63B 2220/53; A63B 71/085; A63B 71/10
See application file for complete search history.

(56) References Cited

U.S. PATENT DOCUMENTS

| 4,883,271 | A |  | 11/1989 | French |
|---|---|---|---|---|
| 5,539,935 | A |  | 7/1996 | Rush, III |
| 5,621,922 | A |  | 4/1997 | Rush, III |
| 5,723,786 | A |  | 3/1998 | Klapman |
| 6,611,782 | B1 |  | 8/2003 | Wooster et al. |
| 6,826,509 | B2 |  | 11/2004 | Crisco, III et al. |
| 6,925,851 | B2 |  | 8/2005 | Reinbold et al. |
| 6,941,952 | B1 |  | 9/2005 | Rush, III |
| 2003/0058817 | A1 | * | 3/2003 | Asai ........................ 370/331 |

(Continued)

OTHER PUBLICATIONS

"Hall Ryan Laboratories Inc.," Wireless Biosensors for Industrial and Sports Safety, Hall Ryan Laboratories Inc., http://hallryan.com/products.html, pp. 4, 2008.

(Continued)

*Primary Examiner* — Omeed Alizada
(74) *Attorney, Agent, or Firm* — Lowe Graham Jones, PLLC

(57) ABSTRACT

Systems and methods for monitoring head-accelerations data for a plurality of athletes. An exemplary system includes a plurality of athlete-mounted sensor units that record acceleration information and wirelessly transmit the recorded acceleration information and information identifying the sensor unit, if the recorded acceleration information exceeds a predefined threshold. A base unit receives the wirelessly transmitted acceleration information and the information identifying the sensor unit and makes the received information available to at least one output device.

20 Claims, 9 Drawing Sheets

(56) References Cited

U.S. PATENT DOCUMENTS

2005/0177929 A1\* 8/2005 Greenwald et al. .............. 2/425
2006/0189852 A1\* 8/2006 Greenwald et al. .......... 600/300
2009/0143842 A1\* 6/2009 Cumbie et al. ................ 607/88

OTHER PUBLICATIONS

Higgins, et al., "Measurement of Impact Acceleration: Mouthpiece Accelerometer Versus Helmet Accelerometer," Journal of Athletic Training, 2007;42(1):5-10, www.journalofathletictraining.org.

\* cited by examiner

COMMUNICATION SYSTEM FOR IMPACT SENSORS

PRIORITY CLAIM

This application claims the benefit of U.S. Provisional Application Ser. No. 61/336,429 filed Jan. 22, 2010 and U.S. Provisional Application Ser. No. 61/409,906 filed Nov. 3, 2010, the contents of both are hereby incorporated by reference.

BACKGROUND OF THE INVENTION

Participation in athletic activities is increasing at all age levels. All participants may be potentially exposed to physical harm as a result of such participation. Physical harm is more likely to occur in athletic events where collisions between participants frequently occur (e.g., football, field hockey, lacrosse, ice hockey, soccer and the like). In connection with sports such as football, hockey and lacrosse where deliberate collisions between participants occur, the potential for physical harm and/or injury is greatly enhanced. Approximately 300,000 athletes incur concussions in the United States each year. This may be a conservative estimate because many minor head injuries go unreported. Although most concussions occur in high-impact sports, athletes in low-impact sports are not immune to mild traumatic brain injury. Head injuries are caused by positive and negative acceleration forces experienced by the brain and may result from linear or rotational accelerations (or both). Both linear and rotational accelerations are likely to be encountered by the head at impact, damaging neural and vascular elements of the brain.

At the school level, school authorities have become sensitive to the risk of injury to which student participants are exposed, as well as to the liability of the school system when injury results. Greater emphasis is being placed on proper training and instruction to limit potential injuries. Some players engage in reckless behavior on the athletic field or do not appreciate the dangers to which they and others are subject by certain types of impacts experienced in these athletic endeavors. Unfortunately, the use of mouth guards and helmets does not prevent all injuries. One particularly troublesome problem is when a student athlete experiences a head injury, such as a concussion, of undetermined severity even when wearing protective headgear. Physicians, trainers, and coaches utilize standard neurological examinations and cognitive questioning to determine the relative severity of the impact and its effect on the athlete. Return to play decisions can be strongly influenced by parents and coaches who want a star player back on the field.

The same problem arises in professional sports where the stakes are much higher for a team, where such a team loses a valuable player due to the possibility of a severe head injury. Recent medical data suggests that lateral and rotational forces applied to the head and neck area (for example, flexion/extension, lateral flexion, and axial rotation) are more responsible for axonal nerve damage than previously thought. Previous medical research had indicated that axially directed forces (such as spinal compression forces) were primarily responsible for such injuries.

Identifying the magnitude of acceleration that causes brain injury may assist in prevention, diagnosis, and return-to-play decisions. Most field measurements assess the acceleration experienced by the player with accelerometers attached to the helmet. The following show some attempts for measuring the impacts to the skull and brain while the player is participating in a sporting activity. U.S. Pat. No. 5,539,935, entitled "Sports Helmet," issued on Jul. 30, 1996 and U.S. Pat. No. 5,621,922, entitled "Sports Helmet Capable of Sensing Linear and Rotational Forces," issued on Apr. 22, 1997 are examples of some of those attempts. Both patents relate to impact sensors for linear and rotational forces in a football helmet. These devices test the impact to the skull of a player. If an athlete suffers a concussion, for example, it will be possible to determine if the relative magnitude of an impact is dangerously high relative to a threshold to which each sensing device is adjusted, taking into consideration the size and weight of the player.

Another attempt performs testing impact acceleration to the head with an intraoral device which provides acceleration information of the brain in various sports. Other attempts have been made, however all these attempts can be costly to implement and fail to provide full historical medical information to coaches, trainers and medical professionals in real-time for dozens of players at a time on one or more adjacent fields.

SUMMARY OF THE INVENTION

The present invention provides a wirelessly linked sports impact sensing and reporting system. The system mainly includes one or more player electronics modules, a sideline module, and a remotely served and remotely accessible recording database module. In one aspect of the invention, the player module is housed independently within the volume of a set of an otherwise standard mouth guard and chin strap assembly, the sideline module is housed within the structure of an otherwise standard clipboard, and the database module is accessible via a network, e.g., public or private Internet.

In one version of the invention, the player module includes a plurality of sensors capable of detecting impact events in multiple axes, a battery, a data memory storage device, a microprocessor and a LED status indicator array. Each player module includes an RF transducer module and an antenna system, capable of establishing a wireless mesh network for reporting the data associated with an impact to the player. A zinc-air primary cell battery is used with the present player module device, but may be substituted by use of a lithium-polymer rechargeable battery or similar.

In another version of the invention, the sideline module includes a radio system capable of acting as a node on the wireless network and receiving signals from any of the player modules participating on the wireless mesh network in real-time. The sideline module also includes a battery, a data memory storage device, a microprocessor and a display capable of indicating impact information per player on the wireless mesh network, severity of impact, and recommended action in near real-time. The sideline module also includes a loudspeaker capable of generating audible alert tones to attract a coach's attention to incoming information in real-time. A zinc-air primary cell battery is used with the present player module device, but may be substituted by use of a lithium-polymer rechargeable battery or similar.

In still another version of the invention, the database module includes a database of players and associated impact data arrangeable by name, team, date, severity of impact, frequency of impact, and many other parameters. The database module is so constructed to be accessible via the public or private data network and is configured to provide various degrees of access to its information contents. Access accounts may be configured according to individual, team, division, league, physician, and administrator levels. Each account will be granted access to the appropriate set of data only, and password protection will ensure dissemination of data only to authorized parties.

In yet an additional version of the invention, an example system includes a mouth guard having a proximity sensor, an accelerometer, a gyroscope, a processor in signal communication with the accelerometer and gyroscope, a memory in data communication with the processor, a transmitter in signal communication with the processor, and a battery that provides power to the processor, the memory, the accelerometer, and the gyroscope. The processor is configured to allow power from a battery to flow to the accelerometer and gyroscope when the proximity sensor detects that the mouth guard has been inserted into a mouth. The processor is also configured to instruct the transmitter to transmit a signal if an acceleration above a predefined first threshold is sensed and to continue transmitting if an acceleration above a predefined second threshold is sensed before a first time period is complete.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
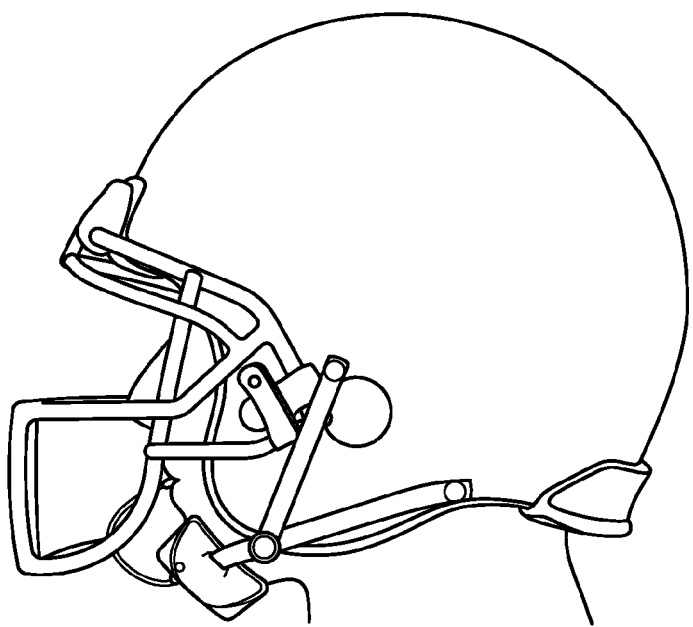
FIG. 1 is a drawing showing an example of the invention in context of a football player's head in profile, while wearing a football helmet and the sensor-enabled mouth guard and chin strap set, i.e. the player module.
Figure 2:
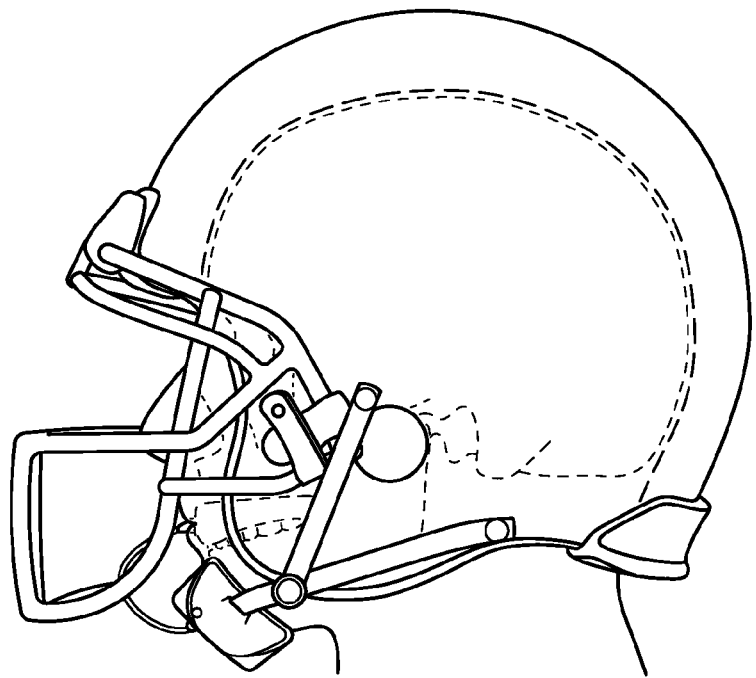
FIG. 2 is a drawing showing the player module in context of its positioning as worn within a human head.

A preferred version of the present invention is a system for the detection, measurement, characterization, transmission, and/or reporting of events causing impact forces to be experienced by players, for example football players. Thus, as shown in FIGS. 1 and 2, a preferred system is configured for use with a mouth guard in a situation in which a player also uses a chinstrap and a helmet. In other examples, various sensors may be incorporated into other housings such as headbands, goggles, or other headgear. The system conveys to an authority figure, preferably a coach or trainer, useful information about the identity of the impacted player, the severity of the impact, and suggested actions for evaluating the condition of the player and for making decisions about the players subsequent status vis-à-vis readiness to return to play or referral to a physician's care.

An example of the player module includes an arrangement of a plurality of low-cost, distributed sensors arranged between the inside surface of the player shell and the bottom surface of a padding elements that provide fit and cushioning to the player's head. These sensors may alternatively be positioned intermediately within the padding element, either at the interface of two laminated elements, or by encapsulation directly within the mass of the padding element. The sensors may also be situated within cavities of the player or in the spaces between padding elements. For example, these sensors may be MEMS type impact sensors, MEMS accelerometers, miniature weighted cantilevers fitted with miniature strain-gauge elements, piezoelectric membranes, or Force-Sensitive-Resistors (FSR).

Figure 3:
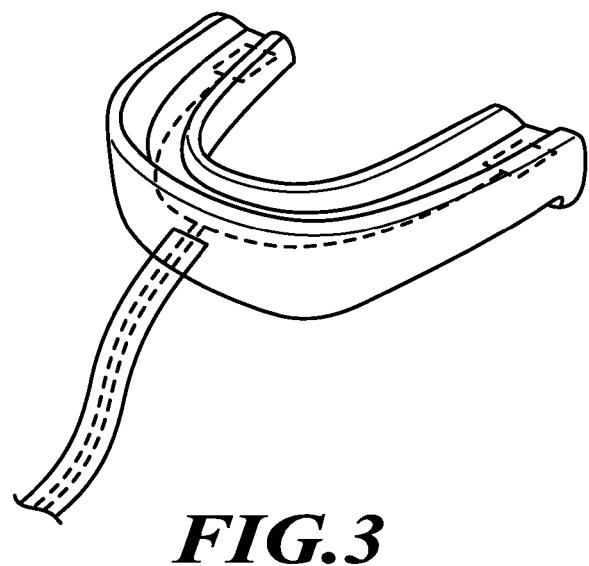
FIG. 3 is a drawing in isometric view showing an example mouth guard element of the player module and indicating the positioning of embedded sensor elements and conductors.
Figure 4:
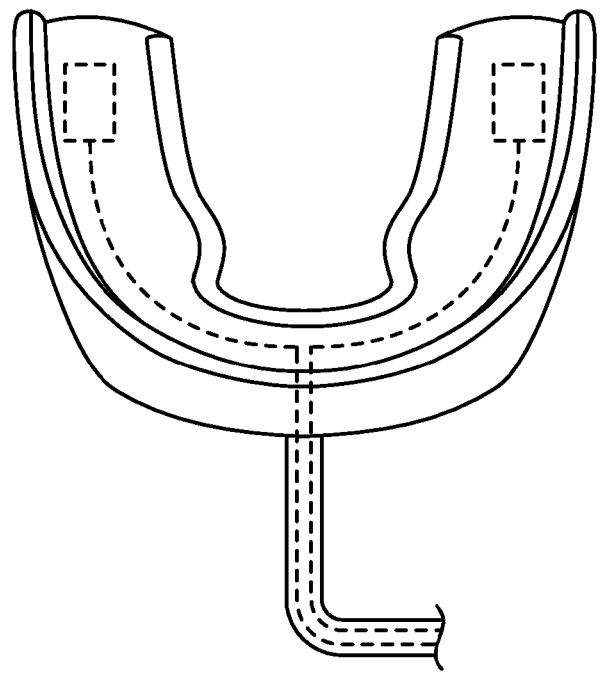
FIG. 4 is a drawing in plan view showing the example mouth guard element of the player module and indicating the positioning of embedded sensor elements and conductors.

In one example, the sensors are incorporated into a sensor unit that is configured as a mouth guard. Thus, as shown in FIGS. 3 and 4, various sensors may be encapsulated into the material formed as a mouth guard. In the illustrated version, sensors are shown being positioned at a lower surface of the mouth guard, beneath the channel formed to receive a user's teeth. As also illustrated, the exemplary mouth guard of FIGS. 3 and 4 includes a wire or tether, preferably encapsulated in a protective covering, extending from a forward portion of the mouth guard in order to send data to a base unit or other device. In other versions, as described below, the mouth guard includes an antenna for wirelessly transmitting the data to an intermediate module or directly to a sideline receiving unit.

Figure 5:
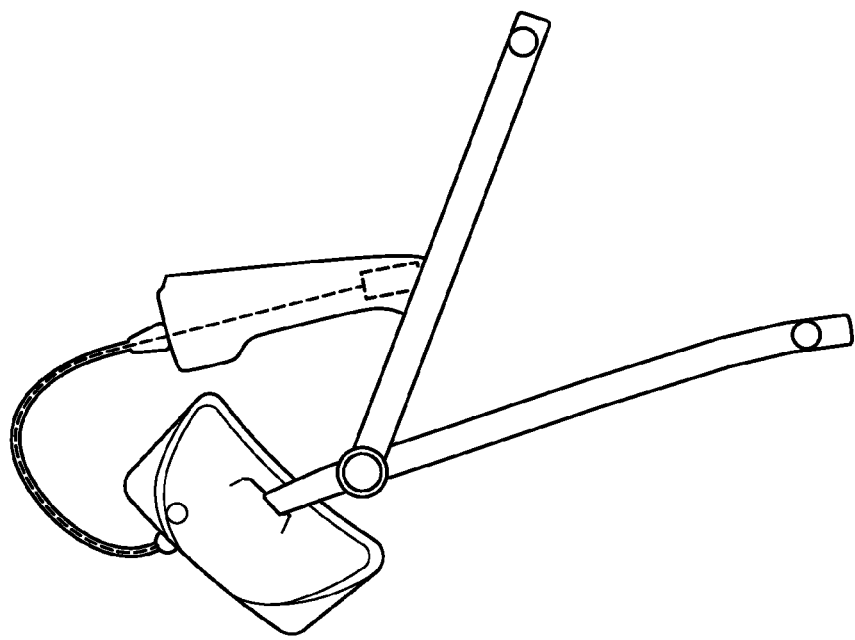
FIG. 5 is a drawing showing a side view of an example player module, including the mouth guard element and chinstrap element, and showing the relationship and connection between the two.
Figure 6:
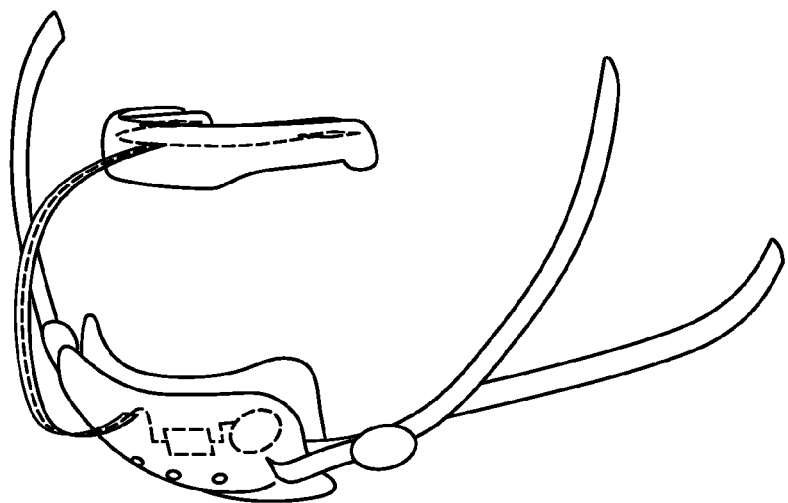
FIG. 6 is a drawing in isometric view showing the player module, including mouth guard and chinstrap elements.

The sensors employed in the player module are connected electronically by means of wires or printed flex circuitry to an electronics pod or other similar means, in some versions situated within a primary shell of the player, and within the space available between two or more padding elements. As illustrated in FIGS. 5 and 6, in some versions the mouth guard sensors are communicatively coupled to a receiving unit contained within a chin strap or other such component external to the mouth. The chin strap includes electronic components to transmit the data received from the mouth guard and then pass it along to a sideline receiving unit. Most preferably the data is passed along in real time, although in some versions the data is stored in a memory and downloaded at a later time.

The electronics pod (whether in the helmet, the mouth guard, the chin strap, or another location) collects, processes, evaluates, and if appropriate, transmits data pertaining to an impact event via radio to one or more other participant nodes of the wireless network to which the player module belongs. The electronics pod contains electronic circuitry having components such as a microprocessor, flash memory, radio module, antenna, and status display LEDs. In the circuit's memory resides a database lookup table for evaluation of sensor data and comparison to combinations of impact levels that represent suspicious likelihood of Mild Traumatic Brain Injury (MTBI) or concussion. The electronics pod is also configured to monitor, evaluate, and/or display system status information such as link to network, battery charge status, and proper system functioning.

Figure 7:
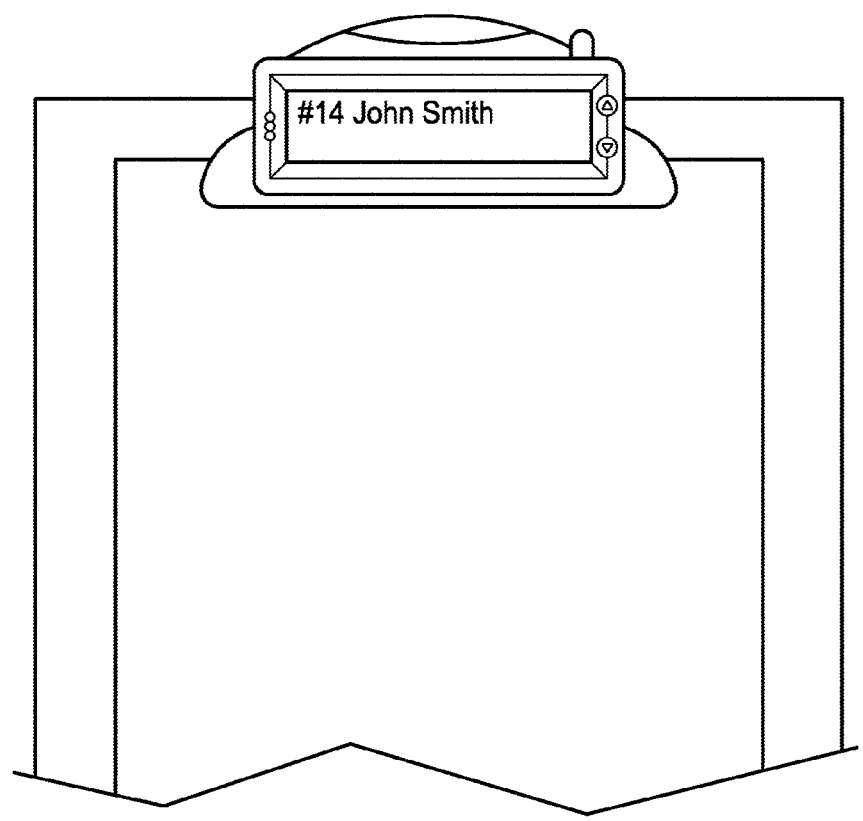
FIG. 7 is a drawing showing a portion of an example sideline module embodied as a clipboard, with a display and input buttons in the uppermost region.

An example sideline module is an electronic data gathering and display device incorporated into a portable enclosure that is easy for a coach, trainer, or other such game official to carry, consult, and interact with during the activities of the practice or game. In one embodiment, the sideline module is embedded into the topmost section of a clipboard, for example as illustrated in FIG. 7. Since the majority of coaches and trainers need to carry clipboards anyway, this is perceived as the most natural and least obtrusive way to provide impact information. However, many other configurations of the sideline module are possible, including building it into a wristband, a stopwatch-style fob with a neck lanyard, a device similar to a mobile phone or pager, etc. The sideline module may be in the form of any electronic receiving device, including laptop computers, mobile phones, or any other such device configurable to receive wireless information. Moreover, the sideline module is described as receiving information directly from the sensor unit, although in some versions of the invention the sensor module may pass its data to an intermediate server or other device which then forwards the information to the sideline module.

The sideline module includes electronic components arranged into a circuit that allows for participation in the wireless mesh network established by a set of player modules, and specifically for the receipt of data transmissions from the player modules, and subsequently the display of impact event information on a visual display in real-time. The sideline module also produces audible and vibratory alert signals to call attention to the arrival of new data messages in real-time, which are disabled by manual conscious intervention of the coach or trainer, indicating acknowledgement of receipt of impact event data.

In one embodiment, the sideline module performs the classification of incoming impact data into one of three categories, indicating differing levels of concern and differing levels of urgency of response. The system employs a "GREEN LIGHT" "YELLOW LIGHT" and "RED LIGHT" system, in which a GREEN LIGHT status indicates the absence of significant impact events for a given player, a YELLOW LIGHT indicates the need for immediate sideline evaluation of the player, and RED LIGHT indicates a severe enough impact that the player be removed from play and referred to a physician immediately.

Upon registering a YELLOW LIGHT impact event, and upon subsequent acknowledgement of receipt of the message by the coach or trainer, the sideline module, in one embodiment, leads the coach or trainer through a simple protocol for evaluation of the player's condition. Through answering a series of simple Yes or No questions, the sideline module guides the coach or trainer to a limited number of possible suggested actions. These potential outcomes could include immediate referral to a physician for further examination, or a period of bench time observation followed by a secondary guided evaluation before allowing the player to return to play.

In one embodiment, a durable record of data transactions is received in real-time and is kept independently of the sideline module or modules. Such a database provides players, parents, coaches, trainers, administrators and other stakeholders access to a record of what impact event information was conveyed, when, to whom and about which player. The sideline module is equipped with a wide area network radio module for transmission of a record of all data transactions on the system with time stamp and a record of the actions by coaches and content of player evaluations. A standard 1 way or 2 way pager system is used, which has the benefit of being inexpensive and nearly ubiquitous in availability throughout much of the world. Alternatives to pager radio systems are cellular radios of various kinds and other wide area network wireless connections. The knowledge that this information will be available to stakeholders provides accountability to all stakeholders in the health and well being of the player.

In one embodiment, the database is populated by an automatic interface to the wide area radio network accessed by the sideline network, and is accessible to stakeholders by means of internet based applications, equipped with password protected hierarchical account structures. The system provides parents the ability to log on to their account and review the totality of impact event data and the record of coach responses associated with their player.

Each player module at the start of each season maps its unique identifier code to a particular player's name and number. It is possible that during the course of events players might accidentally wear the wrong player number and potentially cause confusion by users of the system. It is for this reason that each player module has, in one embodiment, a visual indicator array of LEDs, which will repeatedly flash a visible signal in case of transmission of an impact event of concern. A yellow light flashes to indicate the transmission of a YELLOW LIGHT event, and a red light flashes to indicate the transmission of a RED LIGHT event. When the player is called to the sidelines for evaluation, the coach or trainer can disable the flashing indicator light by simultaneously depressing a button on the player module and a button on the sideline module. This provides positive confirmation that the player who sustained the reported impact is in fact the player being evaluated by the coach or trainer.

Figure 8:
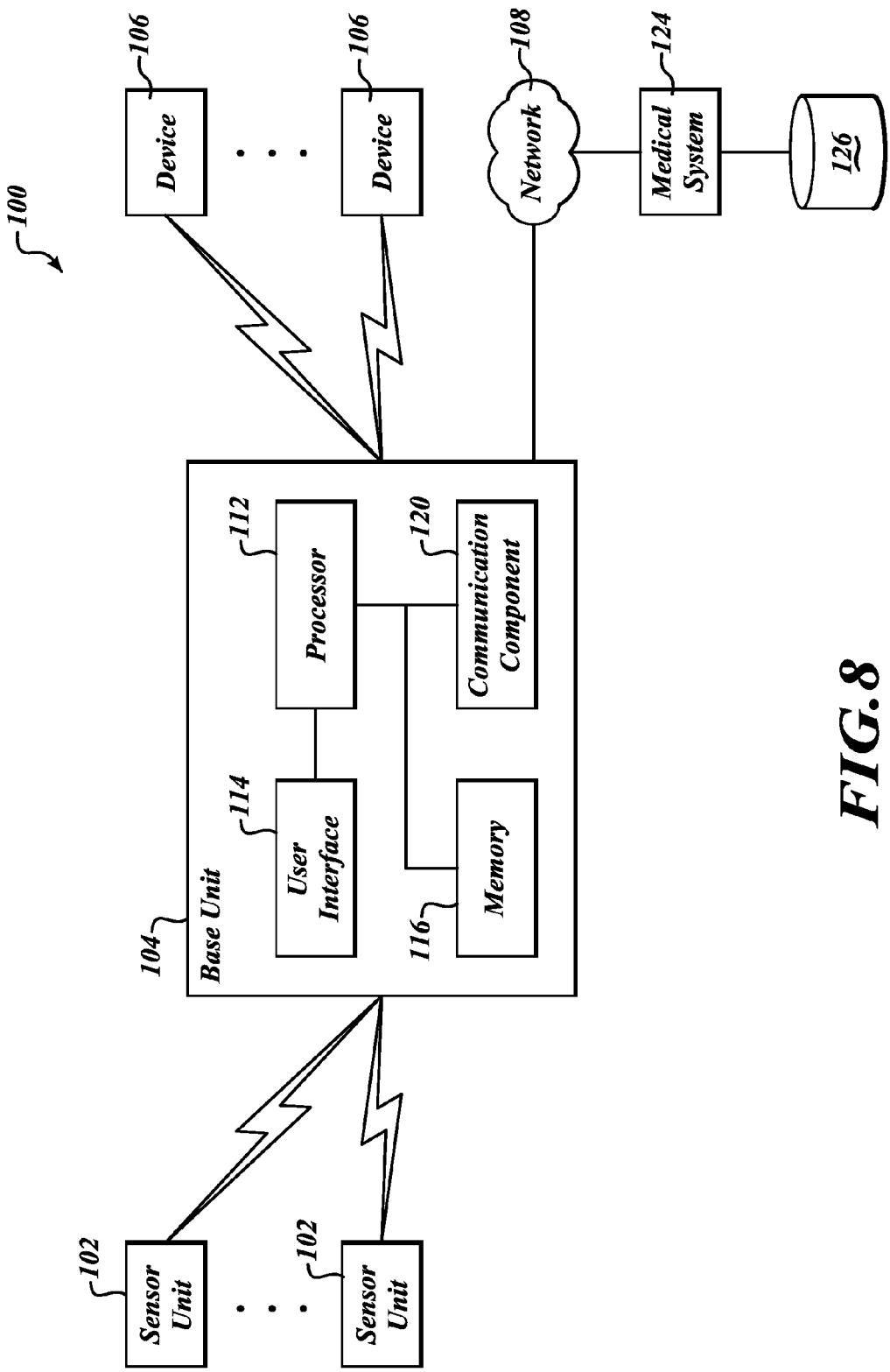
FIG. 8 illustrates an exemplary system formed in accordance with an embodiment of the present invention.

FIG. 8 illustrates an exemplary system 100 that performs aggregation of head-acceleration information received from a plurality of sensor units 102 and makes the acceleration information available to relevant parties. The sensor units are the mouth guards or other components as described above that incorporate one or more sensors. The system 100 includes a base unit 104 that is in wireless communication with one or more sensor units 102 and is optionally in wired or wireless communication with one or more devices 106. As described above, the sensor units may be directly coupled to the base unit, or may alternatively pass their data to the base unit indirectly, through a server, network, or other electronic device. The base unit 104 includes a processor 112, a user interface 114, local memory 116, and a communication component 120. The base unit 104 receives acceleration information wirelessly from each of the sensor units 102 and optionally makes that data available to the one or more additional devices 106.

In some versions, the base unit 104 or any of the devices 106 are in wired or wireless connection with a medical system 124 over a public or private data network 108. The medical system 124 receives acceleration, identification or other information from the base unit 104 or the devices 106 for analysis with regard to stored athlete information and/or storage into a database 126.

In one embodiment, the sensor units 102 include one or more accelerometers or gyros embedded into a device worn on or inside a head cavity (mouth or ear). The sensor units 102 may also include a transmitter, a receiver, memory, or a power source (battery, piezoelectric device, etc.). When a sensor unit 102 has determined that an acceleration event has exceeded a predefined threshold, the sensor unit 102 transmits identification information of the individual sensor unit and recorded acceleration information associated with the acceleration event that exceeded the threshold. The sensor unit may optionally send positional orientation data together with acceleration data related to the event, matching positional data over time with acceleration data over time.

The communication component 120 receives the acceleration information from the sensor unit 102 and delivers it to the processor 112. The processor 112 performs a number of optional operations, such as storing the received acceleration information into the memory 116, analyzing the received information based on predefined athlete information stored in the memory 116, and/or sends processed or unprocessed acceleration and athlete information to one or more of the devices 106 or the medical system 124 via the network 108.

The base unit 104 may be comparable to a wireless router device that uses IEEE 802, which is a family of IEEE standards dealing with local area network wireless communication. It includes just a communication component (transceiver) and a router processor for receiving information from the sensor units 102 and communicating the received information to the devices 106 or other devices that are in signal communication with the base unit 104.

In some versions, the devices 106 are dummy displays that include a communication component receiver for acting as a wireless display for the base unit 104. In another embodiment, the devices 106 are smart computing devices that include a processor, a display, a transceiver and a user interface; for example, a computing tablet device, a personal data assistant (PDA), a watch or any comparable device.

Preferably the device 106 includes local memory. The device 106 presents in a relevant format the acceleration information received from the sensor units 102 via the base unit 104. Typical users of the devices 106 might be a team coach, trainer or medical professional.

Figure 9:
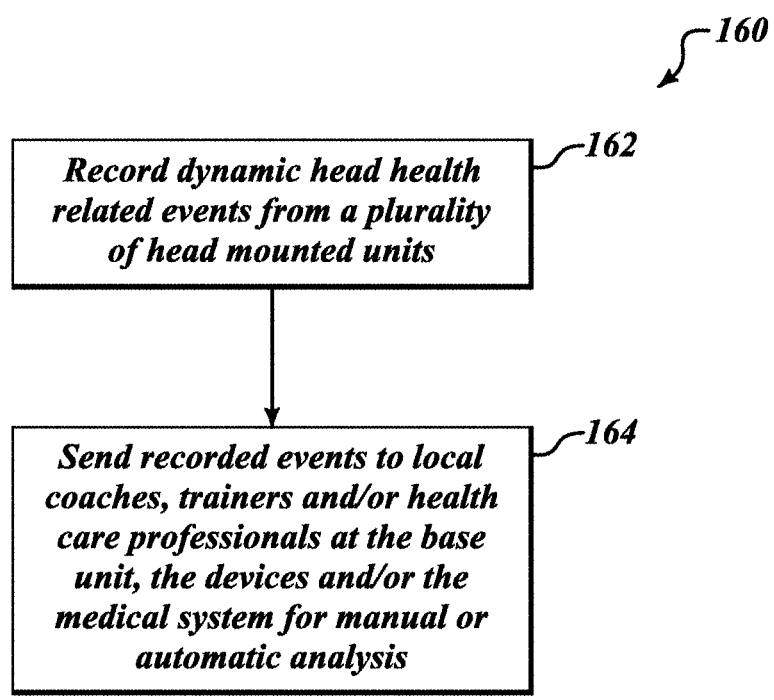
FIGS. 9 and 10 illustrate an exemplary process performed by the system shown in FIG. 8.
Figure 10:
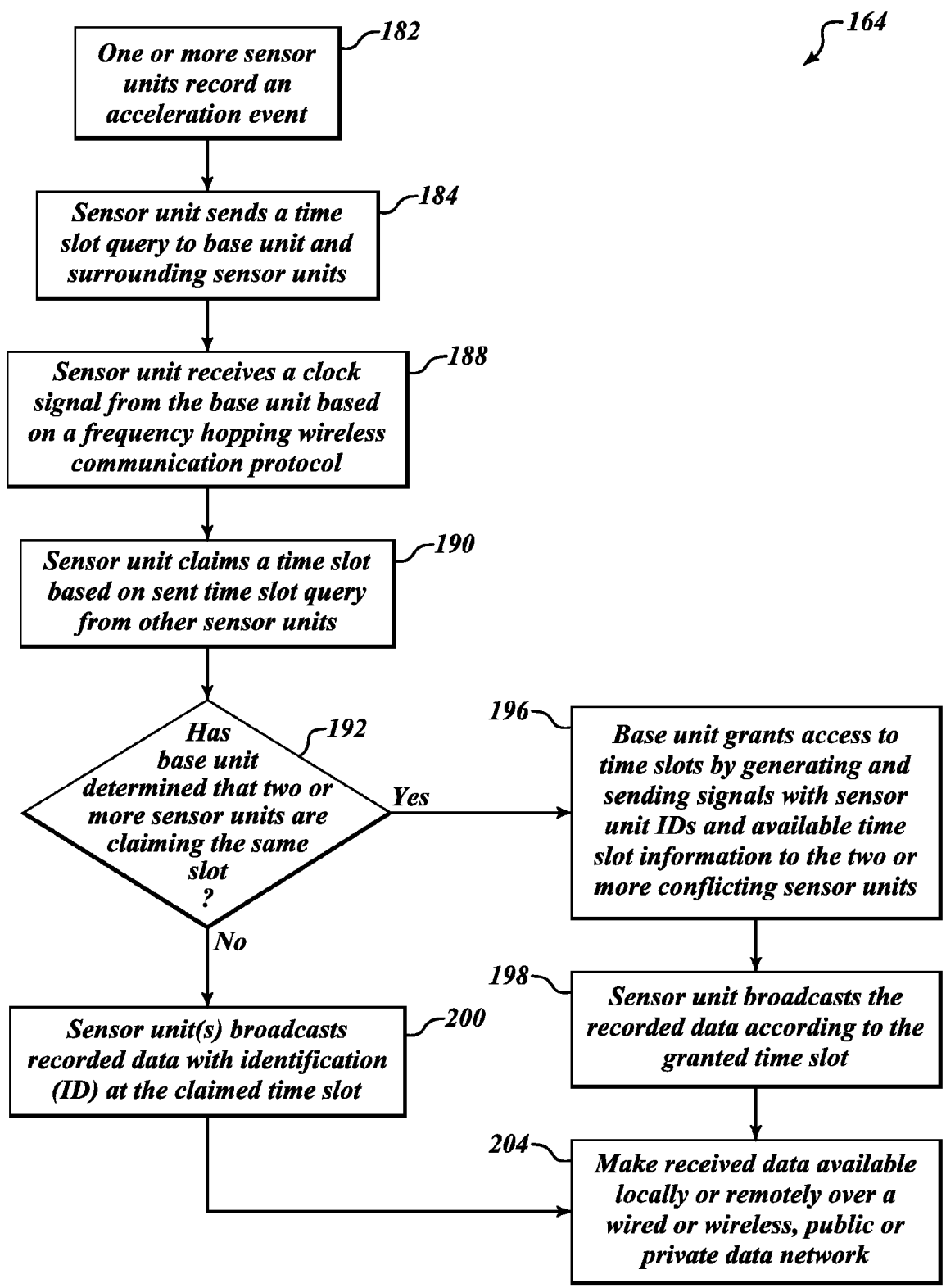

The communication between the base unit 104 and a plurality of sensor units 102 (possibly over a hundred if each player of two football teams includes a sensor unit 102) is carefully managed in order to insure that relevant acceleration information generated by all of the sensor units 102 is successfully transmitted to and processed by the base unit 104. FIGS. 9 and 10 illustrate an exemplary process 160 that describes communication operation performed in the system 100. As shown in FIG. 9, the process 160 begins at a block 162 where the sensor units 102 detect and optionally record any dynamic head-health related events (i.e., head linear or rotational acceleration experienced greater than a threshold amount). At a block 164, the recorded dynamic head-health related events are transmitted locally to coaches or medical professionals at the base unit 104, the devices 106 and/or the medical system 124 for manual or automatic analysis. The process shown at the block 164 is described in more detail below in FIG. 10.

FIG. 10 shows an example process performed at the block 164 of FIG. 9. Most preferably, the system operates within the ISM band at approximately 915 MHz. In other versions, however, it may operate at other frequencies such as 2.4 GHz.

First, at a block 182, one or more of the sensor units 102 record an acceleration event. Initially, the sensor units listen to ensure that a channel is clear before sending data. If the channel is busy, the sensor unit employs a random exponential back-off scheme to avoid collision with other radios on retry attempts. This protocol allows the mouth guard units to stay asleep the majority of the time, conserving battery power. It also allows many radios to co-exist on the network without resorting to the high-precision timekeeping necessary for time-slot protocols. Optionally a system similar to IEEE802.11 RTS/CTS sequence can be added if hidden talker problems dominate the band.

At a block 184, once the channel is clear, the sensor unit 102 that recorded an acceleration event transmits a time slot query that can be heard by the base unit 104 and proximate sensor units 102 (possibly not all proximate to the sensor units 102). Mouth guard radios are assigned addresses and other network and data acquisition parameters from the access point upon joining the network. If not already assigned, the address will be assigned at this stage.

At a block 188, all the sensor units 102 receive a clock signal from the base unit based on a frequency hopping wireless communication protocol (e.g., Bluetooth). This step may be performed at any time, for example, at the start up of the devices 102, 104. The sensor units 102 use the received clock signal to synchronize to the frequency hopping wireless communication protocol. The sensor units adjust their frequency every 100 ms among 50 frequency channels (or more, depending on the particular implementation) according to an algorithm at the access point.

Next, at a block 190, the sensor unit 102 listens for time slot queries from other sensor units 102, then claims a time slot based on the sent time slot queries.

At decision block 192, the base unit 104 determines if two or more sensor units 102 are claiming the same time slot. This would occur for example if two sensor units 102 cannot hear each other's time slot query. If two or more sensor units 102 are claiming the same time slot, the process 164 proceeds to block 196. If two or more sensor units 102 are not claiming the same time slot, the process 164 proceeds to block 200.

At the block 196, the base unit 104 grants access to time slots by generating and sending signals with sensor unit IDs and available timeslot information to the two or more conflicting sensor units 102. Then, at a block 198, the conflicting sensor units 102 broadcast the recorded acceleration event and identification (ID) information according to the granted time slot.

At the block 200, the sensor units 102 broadcast recorded acceleration event and ID information at the claimed time slot. Mouth guard radio packets contain a unique sequence number. Each radio packet is acknowledged (ACK) by the access point. If the mouth guard radio does not receive an ACK, the packet is re-transmitted. If the access point receives the original packet and the retried packet, the retried packet can be discarded because the sequence number will have already been received.

Though described above as sending acceleration events, the mouth guard sends additional data in various embodiments. In general, they send one or more impact parameters corresponding to an impact or movement sensed at the mouth guard. The impact parameters may be in the form of acceleration or, in other versions, may be measures or indicators of movement or other events or forces detected.

In some versions, the mouth guard only transmits impact parameters when an over-threshold event is detected. Thus, the mouth guard includes internal components such as a processor and memory to analyze a detected acceleration or other impact parameter and compare it against stored thresholds. If the detected event is above the threshold, then the unit follows the procedure described above to transmit information related to the event.

In some versions, the mouth guards transmit a state of change of the mouth guard based on an in-mouth sensor. Thus, the mouth guard may include a proximity sensor or other sensor configured to detect whether the mouth guard has been inserted into the mouth. When it is either inserted or removed the mouth guard transmits (according to the protocols described above) an indicator of the position or the state change of the position of the mouth guard.

The mouth guard may further transmit a status packet, indicating battery level, health or functionality of sensors and other components, or other health information.

After blocks 198 and 200, at a block 204, the base unit 104 makes the received data available locally or remotely over a wired or wireless, public or private data network.

Figure 11A:
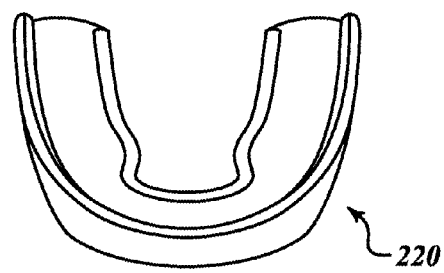
FIGS. 11A-E illustrate various player gear that includes sensor units as included in the system shown in FIG. 8.

FIGS. 11A-E illustrate various embodiments of the sensor units 102. FIG. 11A illustrates a mouth guard sensor unit 220. In one embodiment, the mouth guard sensor unit 220 includes an embedded sensor device. The sensor device includes one or more accelerometers and/or gyroscopes, memory, a power supply, and a communication device. In other embodiments, portions of the sensor device are included in other equipment worn by the athlete (e.g., helmet, chin strap, or other clothing).

Figure 11B:
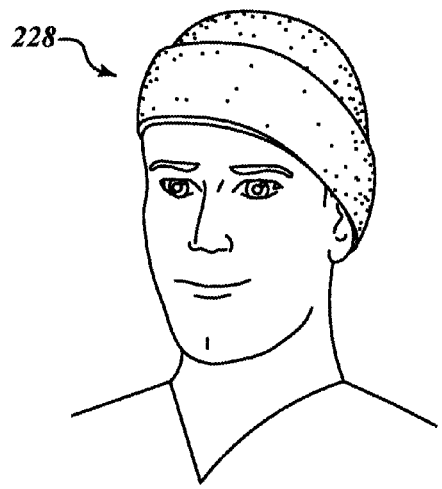

FIG. 11B illustrates a headband 228 that includes the sensor device. In such a version, the accelerometer, memory, battery, and other components may be simply packaged and stitched or otherwise secured within the lining or an interior portion of the headband. Most preferably, the headband further includes an indicator that will allow the user to orient the headband in a particular manner, such as one that will facilitate placement of the accelerometer or other sensor at the center of the forehead or other desired location.

Figure 11C:
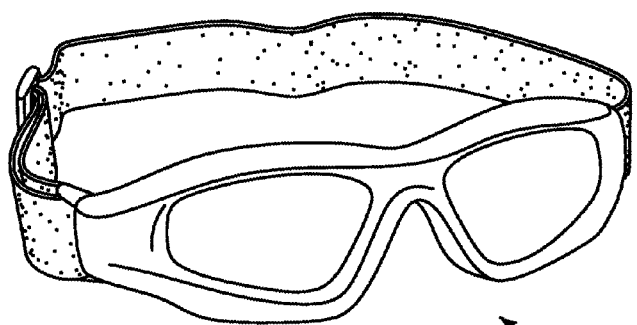

FIG. 11C illustrates a pair of athletic goggles 238 that includes the sensor device. In such a version, the accelerometer is preferably encapsulated in a central location such as at the bridge of the nose. The batteries, memory, and other components may be secured to any other location along the goggles, such as within or on the headband straps of the goggles.

Figure 11D:
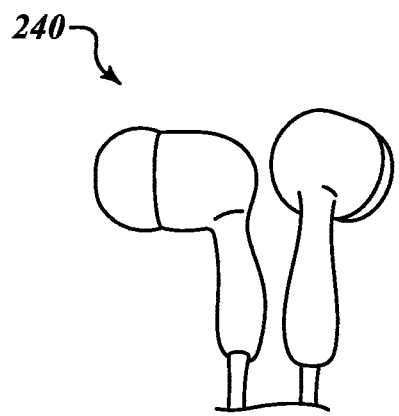

FIG. 11D illustrates a pair of ear buds 240 that include the sensor device. In this version, the accelerometer is secured within the ear bud and therefore not visible.

Figure 11E:
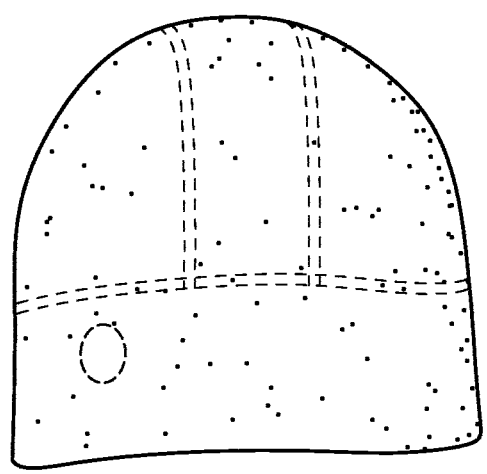

FIG. 11E illustrates a cap with the sensor device being embedded within it in the same fashion as with the headband as described above.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method in a system including a plurality of sensor units to be worn on the heads of a plurality of persons, each one of the plurality of sensor units having a first sensor for detecting whether the sensor unit is worn by one of the plurality of persons and a second sensor for sensing an impact parameter, the method comprising:
    detecting a state of change of the first sensor, including a first state of change from not worn to worn, and a second state of change from worn to not worn;
    transmitting an indicator of the state of change of the first sensor to a base unit;
    sensing impact parameter information in at least one of the plurality of sensor units;
    determining whether the sensed impact parameter information exceeds a threshold; and
    for each one of the plurality of sensor units for which the sensed impact parameter information exceeds the threshold, wirelessly transmitting an indication of the sensed impact parameter information from the sensor unit to the base unit.

2. The method of claim 1, further comprising sending a clock signal from the base unit to the plurality of sensor units, wherein the step of wirelessly transmitting employs a frequency hopping protocol.

3. The method of claim 2, wherein wirelessly transmitting further comprises:
    generating a time slot query at one of the plurality of sensor units based on the clock signal; and
    transmitting the generated time slot query.

4. The method of claim 3, wherein wirelessly transmitting comprises:
    receiving the transmitted time slot query at the base unit;
    determining at the base unit if two or more of the plurality of sensor units are claiming the same time slot based on the received associated time slot queries; and
    transmitting time slot assignment information to the sensor units associated with conflicting time slot queries.

5. The method of claim 4, wherein wirelessly transmitting comprises wirelessly transmitting the impact parameter information based on the transmitted time slot assignment information.

6. The method of claim 1, wherein at least one of the plurality of sensor units is a mouth guard and the first sensor comprises a proximity sensor, and further wherein the first state of change comprises a detection by the proximity sensor that the mouth guard has changed from out of the mouth to inside the mouth of the person.

7. The method of claim 6, wherein the second state of change comprises a detection by the proximity sensor that the mouth guard has changed from inside the mouth to outside the mouth of the person.

8. The method of claim 7, wherein the impact parameter is acceleration, and wherein the method further comprises transmitting positional orientation information over time and acceleration information over time.

9. The method of claim 7, wherein the impact parameter is motion.

10. A system comprising:
    a plurality of wearable sensor units and a base unit;
    each one of the plurality of sensor units being configured to:
        detect whether the sensor unit is positioned on the head of a person;
        transmit an indicator of the detected position of the sensor unit on the head of the person to the base unit, including a first indicator that the sensor unit is positioned on the head of the person and a second indicator that the sensor unit is not positioned on the head of the person, the sensor unit further transmitting the indicator when the detected position of the sensor unit changes between positioned on the head and not positioned on the head, and further between not positioned on the head and positioned on the head;
        sense impact parameter information;
        determine whether the impact parameter information exceeds a set threshold; and
        wirelessly transmit the impact parameter information and information identifying the sensor unit to the base unit if the acceleration information exceeds the threshold; and
    the base unit being in data communication with the plurality of sensor units, the base unit configured to:
        receive the wirelessly transmitted impact parameter information and the information identifying the sensor unit.

11. The system of claim 10, further comprising a display, wherein the base unit is configured to present a representation of the impact parameter information on the display.

12. The system of claim 10, wherein the base unit is further configured to transmit a clock signal, and further wherein the plurality of sensor units are further configured to wirelessly transmit by generating a time slot query at one of the plurality of sensor units based on the clock signal and transmitting the generated time slot query.

13. The system of claim 12, wherein the base unit is further configured to:
receive the transmitted time slot query;
determine if two or more of the plurality of sensor units are claiming the same time slot based on the received associated time slot queries; and
transmit time slot assignment information to the two or more sensor units associated with conflicting time slot queries.

14. The system of claim 13, wherein one or more of the plurality of sensor units wirelessly transmit the recorded impact parameter information and information identifying the one or more sensor unit based on the transmitted time slot assignment information.

15. The system of claim 10, wherein at least one of the plurality of sensor units comprises an accelerometer and the impact parameter is acceleration, and further wherein at least one of the sensor units detects positional orientation, the sensor unit transmitting positional information over time when transmitting acceleration information.

16. The system of claim 10, wherein at least one of the sensor units comprises a mouth guard and a proximity sensor, wherein the sensor unit and the proximity sensor are attached to the mouth guard, and further wherein the proximity sensor is configured to detect whether the mouth guard is positioned in the mouth of the person, whereby the sensor unit is configured to transmit an indicator of the detected position of the sensor unit on the head of the person to the base unit when the proximity sensor detects that the mouth guard is positioned in the mouth of the person.

17. The system of claim 16, further comprising a transmitter embedded within the mouth guard for wirelessly transmitting the impact parameter information and information identifying the sensor unit to the base unit.

18. The system of claim 10, further comprising headgear and a transmitter, wherein at least one of the sensor unit or the transmitter is secured to the headgear.

19. The system of claim 10, further comprising at least one ear bud, the sensor unit being secured to the ear bud.

20. The system of claim 10, further comprising a pair of goggles, the sensor unit being secured to the pair of goggles.

* * * * *